United States Patent [19]
Garvie et al.

[11] 4,067,745
[45] Jan. 10, 1978

[54] CERAMIC MATERIALS

[75] Inventors: Ronald Charles Garvie, Beaumaris; Richard Henri Jan Hannink, Oakleigh; Richard Terry Pascoe, Ashwood, all of Australia

[73] Assignee: Commonwealth Scientific and Industrial Research Organization, Campbell, Australia

[21] Appl. No.: 625,620

[22] Filed: Oct. 24, 1975

[30] Foreign Application Priority Data

Oct. 24, 1974 Australia ............................... 9368/74

[51] Int. Cl.² ............................................. C04B 35/48
[52] U.S. Cl. ..................................................... 106/57
[58] Field of Search ................................ 106/57, 73.2

[56] References Cited

U.S. PATENT DOCUMENTS

| 3,620,781 | 11/1971 | Garvie | 106/57 |
| 3,887,387 | 6/1975 | Sturhahn | 106/73.2 |
| 3,929,498 | 12/1975 | Hancock et al. | 106/57 |

Primary Examiner—J. Poer
Attorney, Agent, or Firm—Sughrue, Rothwell, Mion, Zinn and Macpeak

[57] ABSTRACT

Calcia-partially-stabilized zirconia ceramic materials which contain between 3.3 and 4.7 percent of calcia by weight. Such materials have a fine-scale two-phase microstructure substantially consisting of metastable, tetragonal domains of a critical size within cubic matrix grains, which domains, in regions of high stress, irreversibly transform to normal monoclinic form upon stressing of the body.

The materials are produced by firing a zirconia body containing between 3.3 and 4.7 percent by weight of calcia at a temperature between 1700° C and 1950° C and allowing the body to cool at an average rate of at least 175° C per hour to a temperature within the range 1200° to 1450° C; followed by ageing with said temperature range for a time such that peak strength is obtained.

17 Claims, 12 Drawing Figures

STRENGTH DATA FOR FAST AND SLOW COOLED PSZ CERAMICS

FIG. 1.

PARTIAL PHASE DIAGRAM OF THE $CaO-ZrO_2$ SYSTEM

FIG.2.

FURNACE COOLING RATE CURVES.

FIG. 3.

TIME TO PEAK STRENGTH AS A FUNCTION OF COMPOSITION.

FIG.5.

(a) AS FIRED SURFACE  (b) SURFACE CUT BY DIAMOND SAW (c) SAME SURFACE AS (b), POLISHED  (d) MATERIAL GROUND TO −325 MESH, TUNGSTEN CARBIDE MILL

X−RAY DIFFRACTION PROFILES OF PSZ

(a) STRONG

(b) WEAK

SURFACE REPLICA — TEM MICROSTRUCTURE OF STRONG AND WEAK PSZ

FIG.8.

(a) FAST COOLED

(b) SLOW COOLED

X-RAY DIFFRACTION DATA FOR FAST AND SLOW COOLED PSZ CERAMICS

FIG. 9.

(a) FAST COOLED (b) SLOW COOLED

X-RAY DIFFRACTION DATA FOR FAST AND SLOW COOLED PSZ CERAMICS

FIG. 10.

CERAMIC MATERIALS

This invention concerns partially stabilised zirconia (zirconium oxide, $ZrO_2$) ceramic refractory materials (referred to hereonafter as PSZ ceramics) and more particularly relates to specific ceramic compositions, within a known range of compositions, which possess markedly improved and hitherto unsuspected properties when compared with ceramic materials which have a composition close to that of the present invention. The word 'refractory' should be construed in its widest sense to embrace resistance to degradation such as wear, surface deterioration, cracking, spalling and the like in severe environments of all types, including as suchsingly or together-abrasion, corrosion, erosion and the like, and stresses both mechanically applied as steady or variable loads, including impact stresses, under a wide range of temperature conditions, and also stresses arising from changes in temperature of the body.

In the specification of U.S. Pat. No. 3,620,781, Ronald C. Garvie describes a partially stabilised zirconia refractory (ceramic) material which has calcia (calcium oxide, CaO) as the stabilising medium in concentrations from 2 to 5 weight percent, and preferably in the range from 3 to 4 percent. Bodies prepared from this material, it is stated, have enhanced modulus of rupture in flexure (MOR) and Young's Modulus of elasticity (MOE) compared with other partially stabilised zirconia materials. The improved performance of the above material is attributed to the presence of a microstructural constituent not present in other (calcia) partially stabilised zirconia compounds, namely a finely divided precipitate (approximately 1000A in diameter) of monoclinic zirconia dispersed intragranularly throughout the cubic crystalline grains, which constitute the major microstructural phase by volume. The cubic grains are believed to be essentially a solid solution of zirconia in a compound having the formula $Ca Zr_4O_9$. More recently, R. C. Garvie and P. S. Nicholson have reported (J. Amer. Ceram. Soc. 55 (3), 152–157, 1972) that the finely divided coherent precipitate and its matrix are now believed to exist as hybrid single crystals, the precipitate and the matrix being in a crystallographic relationship with each other.

In the following description, reference will be made to the accompanying drawings in which.

Figure 1:
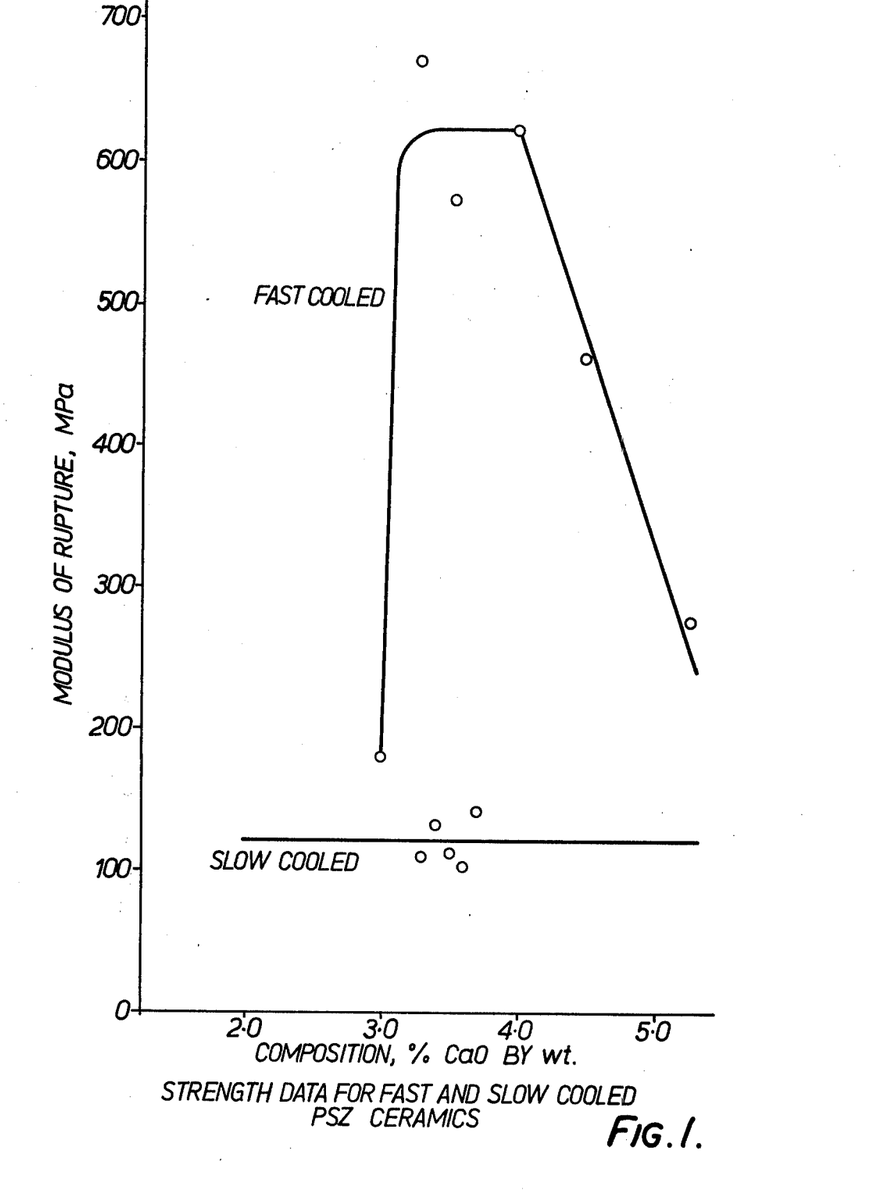
FIG. 1 is a graph showing strength data for fast-and slow-cooled PSZ ceramics.

It has hitherto been understood that the improved MOR and MOE properties of zirconia partially stabilised with calcia are independent of composition (as in the manner of the curve of FIG. 1 labelled 'slow cooled'), over the range of calcia content from 2 to 5 percent by weight. It has also been understood that a particular method of making such partially stabilised zirconia refractories — the method described in the previously mentioned U.S. Patent specification No. 3,620,781 — is essential for these properties to be attained. Further and more detailed research by us has now shown that, within this range of calcia concentration, a surprisingly improved material can be obtained if the calcia concentration is held to within a narrower range of from 3.3 to 4.7, more preferably 3.4 to 4.2, percent by weight, and still more preferably about 4.0 percent by weight, and if the cooling rate from the firing temperatures to the ageing temperature is greater than an average rate of 175° C per hour and is preferably about 600° C per hour. This is shown by the curve labelled 'fast cooled' in FIG. 1.

The same controlled microstructure can be obtained using the $MgO-ZrO_2$ system. In this system ceramics also can be produced with enhanced mechanical properties. However there are two difficulties with $MgO-ZrO_2$ ceramics:

a. the kinetics of precipitation are about 10 times faster than those in the $CaO-ZrO_2$ system. Such fast precipitation rates make it difficult to introduce quality control procedures into the ceramic manufacturing process;

b. all compositions in the $MgO-ZrO_2$ system suffer a eutectoid decomposition reaction below 1400° C which degrades the mechanical properties. This reaction compounds the problem of quality control in the $MgO-ZrO_2$ system.

According to the present invention there is provided an improved calcia-partially-stabilised zirconia ceramic material which contains between 3.3 and 4.7 percent of calcia by weight.

More particularly, the present invention provides a tough, refractory ceramic comprising essentially a calcia-partially stabilised zirconia body, characterised in that the calcia concentration lies within the range 3.3–4.7 percent by weight of the ceramic body, and in that said body has a fine-scale two-phase microstructure substantially consisting of metastable tetragonal domains of a critical size within cubic matrix grains. These domains, in regions of high stress, irreversibly transform to normal monoclinic form upon stressing of the body.

Recently, ceramics derived from the $CaO-ZrO_2$ system by forming precipitates of monoclinic zirconia have been subject to considerable investigation by Prof. Nicholson and his students at McMaster University, Hamilton, Canada and also Prof. Heuer and his students at Case Western Reserve University, Cleveland, U.S.A. A discussion of this prior art is in order. The relevent publications are as follows.

1. "Fracture toughness of a partially stabilized $ZrO_2$ in the System $CaO-ZrO_2$". D. Green, P. Nicholson and J. Embury. J. Amer. Ceram. Soc. 56 (12) 619–623 (1973) Composition: 3.4 w/o CaO; fired 5 hours at 1850° C, slow cooled to 1300° C, then fast cooled. The samples were made according to U.S. Pat. No. 3,620,781 except there was no deliberate ageing treatment. In fact the samples were all overaged because they were cooled too slowly from the firing temperature. Typical mechanical properties were MOR = 15.9 MPa; WOF* = 180 J/m².
(*Work of fracture)

2. "Thermal shock structures in a partially stabilized $ZrO_2$ in the system $CaO-ZrO_2$". A. El-Shiekh and P. Nicholson. J. Amer. Ceram. Soc. 57 (1) 19–21, (1974)
The samples were the same as those discussed in reference 1, except that they were aged for 24 hours at 1300° C. In an attempt to interpret his experimental data on thermal shock Nicholson hypothesised the possible transient formation of metastable tetragonal zirconia at 1000° C.

3. "Microstructural development in partially stabilized $ZrO_2$ in the system $CaO-ZrO_2$." D. Green, D. Maki and P. Nicholson. J. Amer. Ceram. Soc. 57, (3) 136–139 (1974)
Three batches were prepared with a composition of 3.4 w/o CaO.

Batch 1. Fired 1850° C, 5 hours; cooled to 1300° C at 100° C/hour, aged 25 hours at 1300° C.

Batch 2. Fired 1850° C, 5 hours, cooled to 1300° C at 100° C/hour, quenched to R.T.

Batch 3. Fired 1850° C, 5 hours; quenched to 1300° C; aged 25 hours at 1300° C.

The procedure used in Batch 3 is nominally similar to the processes described in this patent specification. However the MOR of Batch 3 material is only 152 MPa compared with 600 MPa for material made as described in this patent specification.

4. "Precipitation in partially stabilized zirconia". G. Bansal and A. Heuer. J. Amer. Ceram. Soc., 58, (5–6) 235–238, (1975)
This is an electron microscope study of thin films of Batches 1, 2 and 3 from Reference 3. Only monoclinic precipitation of $ZrO_2$ in matrix grains was observed. Batch 3 material was low strength as mentioned in the discussion of Reference 3, and had only monoclinic precipitates. Therefore, though the processing is nominally similar, it is not possible for this material to have been processed by the quantitative methods described in this patent specification. It is pertinent to note that Bansal and Heuer state: "However, the tetragonal form of pure $ZrO_2$ cannot be retained at room temperature. . ."

In summary, the prior art does not teach the possibility of forming metastable tetragonal zirconia in PSZ ceramics derived from the $CaO-ZrO_2$ system. Also the prior art does not teach that markedly enhanced mechanical properties are associated with PSZ materials containing appreciable quantities of metastable tetragonal $ZrO_2$. In fact, the prior art teaches that the existence of metastable tetragonal $ZrO_2$ in PSZ ceramics derived from the $CaO-ZrO_2$ system is unlikely.

The present invention also provides a process for forming a partially stabilized zirconia ceramic which consists of firing a zirconia body containing between 3.3 and 4.7 percent by weight of calcia at a temperature between 1700° C and 1950° C and allowing the body to cool at an average rate (defined below) of at least 175° C per hour until the temperature is within the range 1200° C to 1450° C; and ageing the body at a temperature in the range 1200° C to 1450° C for a time such that peak strength is obtained.

The following process variables must be specified in order to make high performance PSZ ceramics reliably: composition, firing temperature, cooling-rate, ageing temperature and ageing time. These variables are all strongly interrelated; that is, once a composition is specified within the range 3.3–4.7 percent by weight CaO, there is a particular combination of firing temperature, cooling rate, ageing temperature and ageing time to produce the optimum thermo-mechanical properties.

Figure 2:
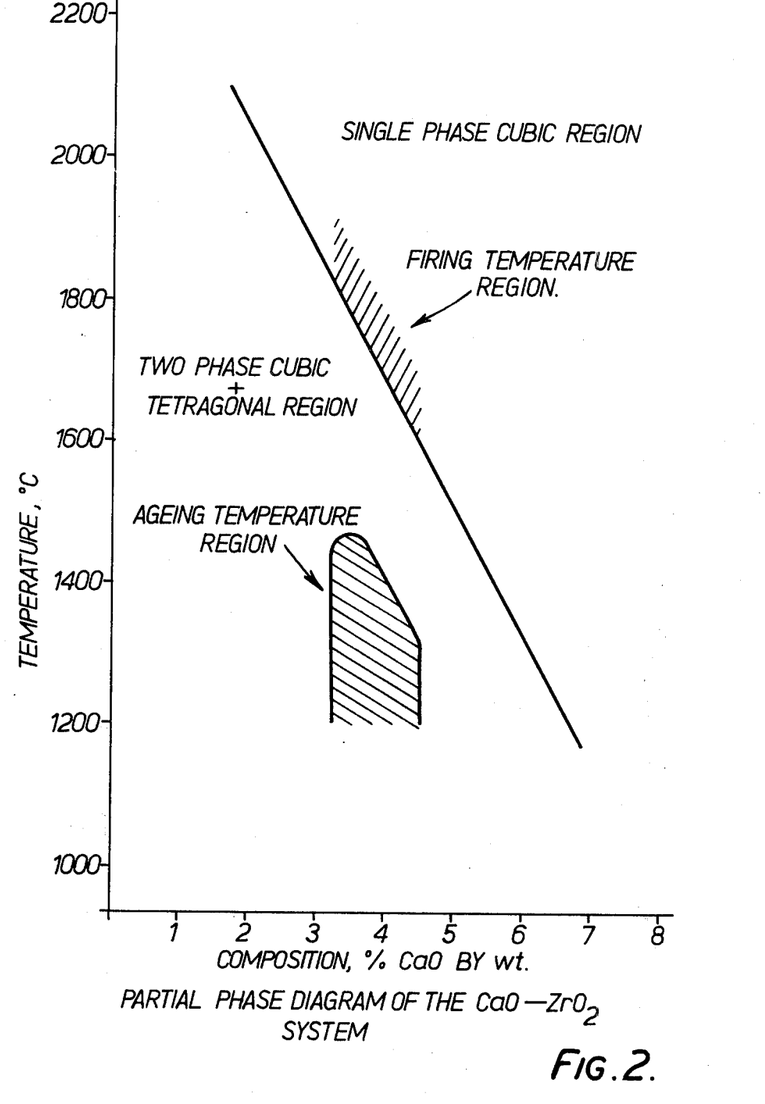
FIG. 2 is a partial phase diagram for the $CaO-ZrO_2$ system.

The relationship between composition and firing temperature is shown in FIG. 2 which depicts a partial phase diagram for the $CaO-ZrO_2$ system. For the specified composition range the appropriate firing temperature lies in the hatched region along the boundary which separates the single phase cubis region from the two phase region. In other words, each composition must be heated to a temperature such that it forms a substantially single phase cubic material.

Figure 3:
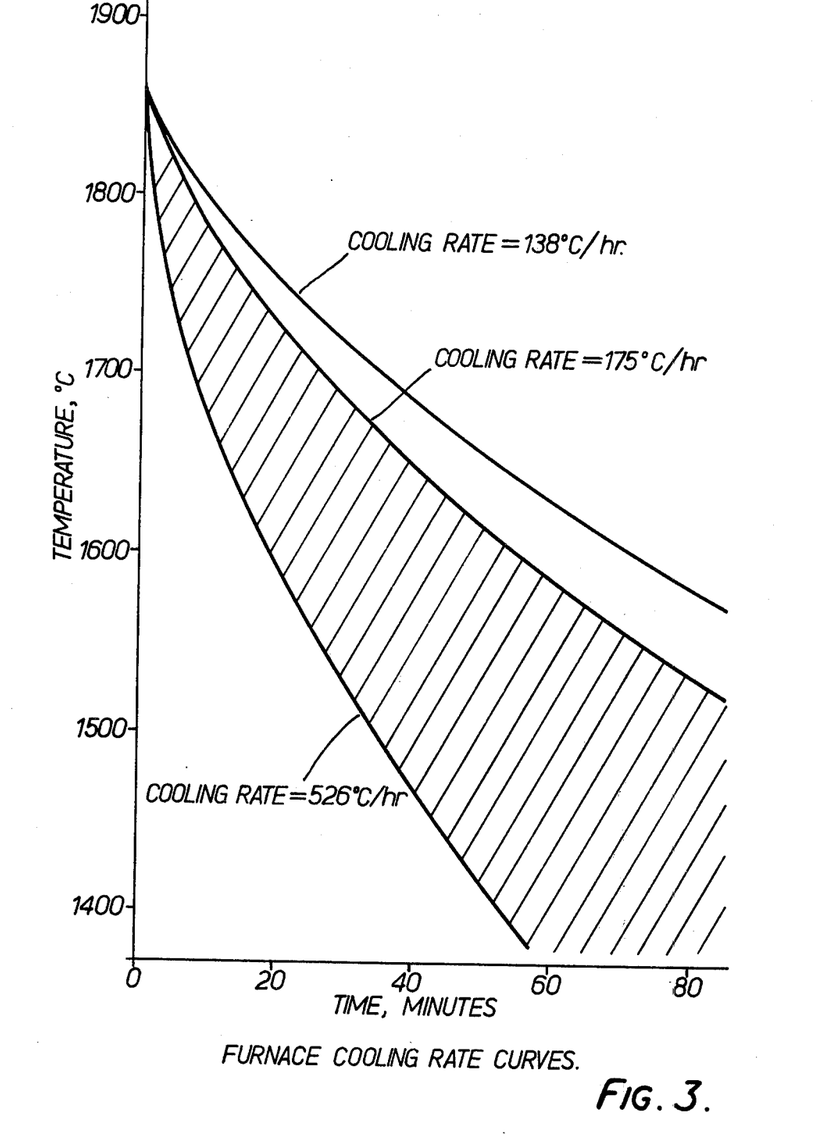
FIG. 3 is a graph showing cooling rate curves.

Acceptable cooling rates are illustrated by the experimental data shown in FIG. 3. The cooling conditions were obtained in furnaces of various dimensions by simply turning the particular furnace off and allowing it to cool naturally. The maximum cooling rate thus obtainable was 526° C per hour. Acceptable rates lie within the hatched region. An average cooling rate is defined by obtaining the difference between the firing temperature and 1400° C and dividing it by the time taken for the furnace temperature to fall from the former temperature to the latter. Rates faster than the maximum shown are also acceptable but may be impractical because of thermal shock problems and/or equipment limitations. Rates slower than the minimum produce ware with degraded properties, as shown in the following table.

| Composition, w/o CaO | 3.6 | 3.6 | 4.0 |
|---|---|---|---|
| Firing temperature, ° C | 1950 | 1950 | 1950 |
| Average Cooling Rate ° C/hr | 526 | 175 | 138 |
| Ageing Temperature, ° C | 1300 | 1400 | 1300 |
| Maximum MOR, MPa | 620 | 520 | 170 |

Figure 4:
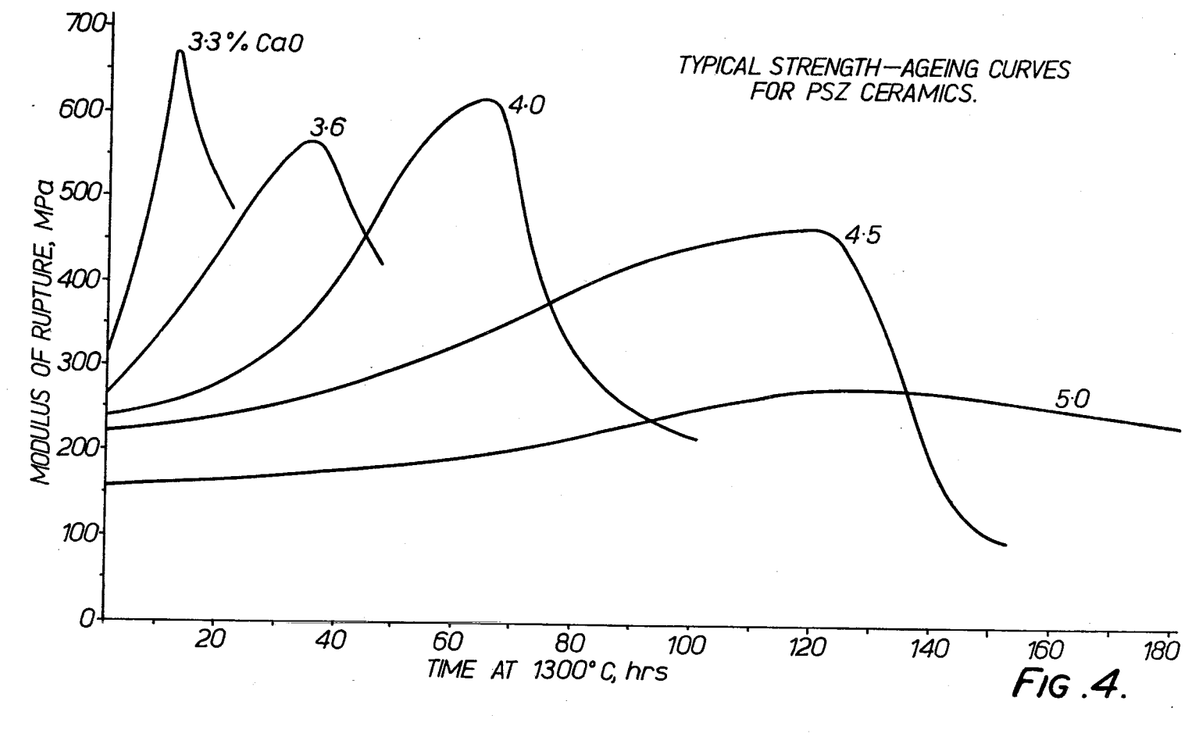
FIG. 4 is a set of strength/ageing curves for PSZ ceramics.
Figure 5:
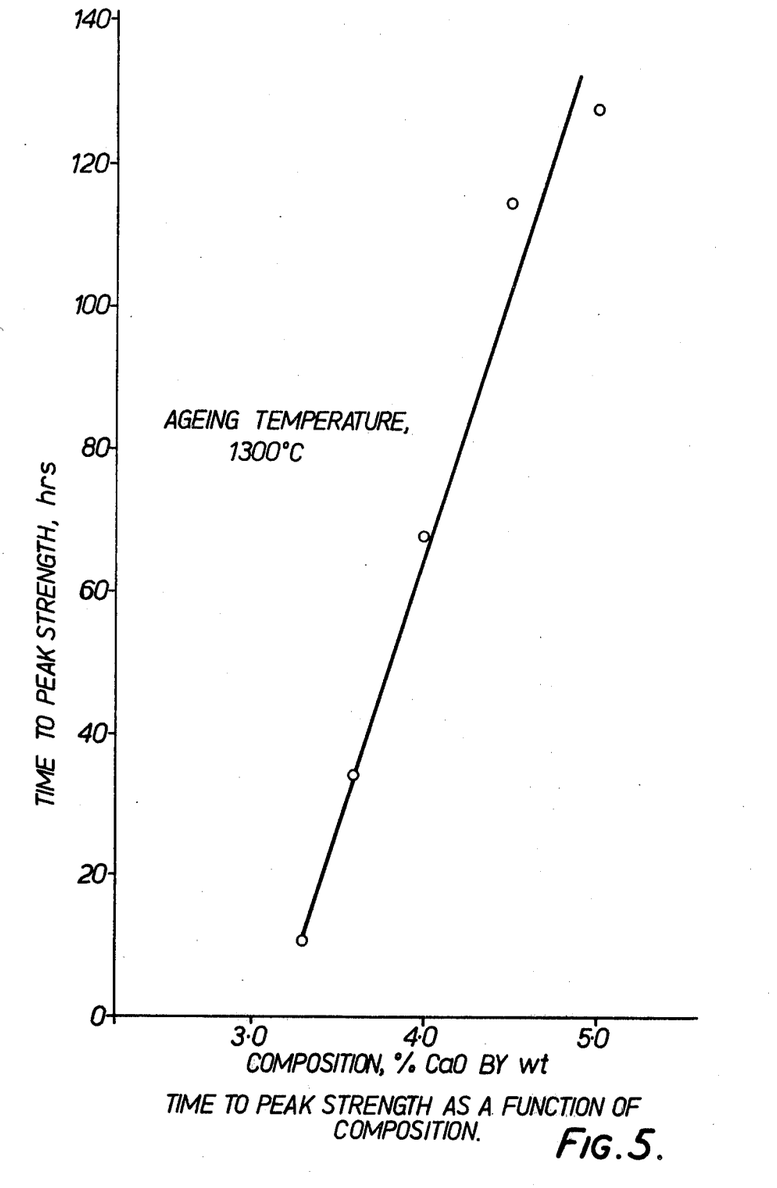
FIG. 5 is a graph showing the time to peak strength as a function of composition for PSZ ceramics.

Suitable ageing temperatures are defined by the cross-hatched area shown in FIG. 2. The preferred temperature is 1300° C. Typical curves showing MOR as a function of ageing time at 1300° C for various compositions are given in FIG. 4. In each case, the MOR rises to a maximum value at a critical ageing time and then declines. A plot of time to peak strength as a function of composition is given in FIG. 5. With an appropriate choice of composition it is not necessary to have a formal ageing process as such. The material need only be cooled slowly in the range 1400°–1000° C to generate the controlled microstucture.

It is also possible to achieve the desired microstructure by carrying out the heat treatment, including rapid cooling and the ageing procedure as separate operations. For example, it may be convenient in some circumstances to form the ceramic body by firing in the specified temperature range followed by rapid cooling (as specified above) to room temperature. The ageing operation can then be carried out as a separate operation by reheating the body to the ageing temperature (1200° C to 1450° C) and holding the body at that temperature for the required time.

High performance partially stabilised zirconia (PSZ) materials cannot be fabricated using the method described in U.S. patent specification No. 3,620,781 because in that specification no account was taken of the critical cooling rate or the critical ageing times.

A preferred method of fabricating PSZ ceramics which allows reliable production comprises the steps of:

a. preparing a batch of material consisting of, on an analytical oxide basis, zirconia and calcia, so that the calcia, on firing, comprises from 3.3 to 4.7 percent by weight of the product. The preferred composition is 4 percent by weight CaO because the ageing time is short enough to be practical, yet long enough to allow good quality control.

b. moulding the material by any suitable technique such as dry pressing, isostatic pressing, slip casting and the like into a body which after firing will have the required dimensions.

c. heating the body to the firing temperature in the range 1700°–1950° C for a period of about 3 to 5 hours, about 1800° C for 3 hours being the preferred conditions for 4 weight percent CaO, and d. allowing the body to cool at an average temperature in the range between 175° C and about 600° per hour, typically about 525° C per hour, to an ageing temperature in the range 1200° C to 1350° C, preferably about 1300° C, and maintaining it at that temperature until peak strength is obtained, then e. allowing the body to cool to ambient temperature.

The ageing time is typically about 64 hours for the preferred conditions and composition specified in items (c) and (d).

Where ageing is carried out as a separate operation, the body is not aged as in step (d) but is allowed to cool to ambient temperature. Subsequently, the body is reheated to ageing temperature and maintained at that temperature for the required period.

In step (a), high purity zirconia obtained from commerical sources is preferred. If appreciable amounts of impurities are present the kinetics of ageing are changed slightly. Small amounts of MgO introduced by milling with $MgO-ZrO_2$ grinding media can be tolerated. The zirconia may be milled thoroughly with either powdered pure calcia, or a powder of a heat decomposable compound, having as its solid decomposition product at the sintering temperature, pure calcia. Such heat decomposable compounds include calcium oxalate, acetate, nitrate, fluoride, sulphate, carbonate and hydroxide and are preferred because, in calcining to an appropriate temperature to perform the decomposition, they produce a reactive form of calcia which gives rise to improved density in the subsequent firing of the body. Milling is effected by conventional means such as blending in a jar mill for a suitable time.

The batch mixture, after calcining and then milling again if a heat-decomposable compound has been added, is then moulded as in step (b) and for this purpose a binder is generally used, such as polyethylene glycol wax, as described in U.S. patent specification No. 3,620,781. After moulding by any suitable technique such as dry pressing, isostatic pressing, slip casting and the like, the 'green body' is heated to a temperature (the firing temperature) to ensure the formation of a substantially single phase cubic structure.

The reasons for the marked enhancement of the mechanical properties brought about by critically cooling and ageing the optimum composition are as follows. During cooling to the ageing temperature an embryonic fine-scale two-phase microstructure develops, apparently consisting of tetragonal domains within the cubic matrix grains, as described above. For the optimum properties, the cooling rate and the ageing conditions must be such that the two phase microstructure nucleates and coarsens to a critical degree so that at room temperature the tetragonal domains are metastably preserved in the tetragonal form because of their small size. When the PSZ ceramic with this carefully controlled microstructure is stressed, the martensitic tetragonal-monoclinic phase transformation is triggered in the tetragonal domains in regions of high stress which then transform to their normal monoclinic form.

Figure 6:
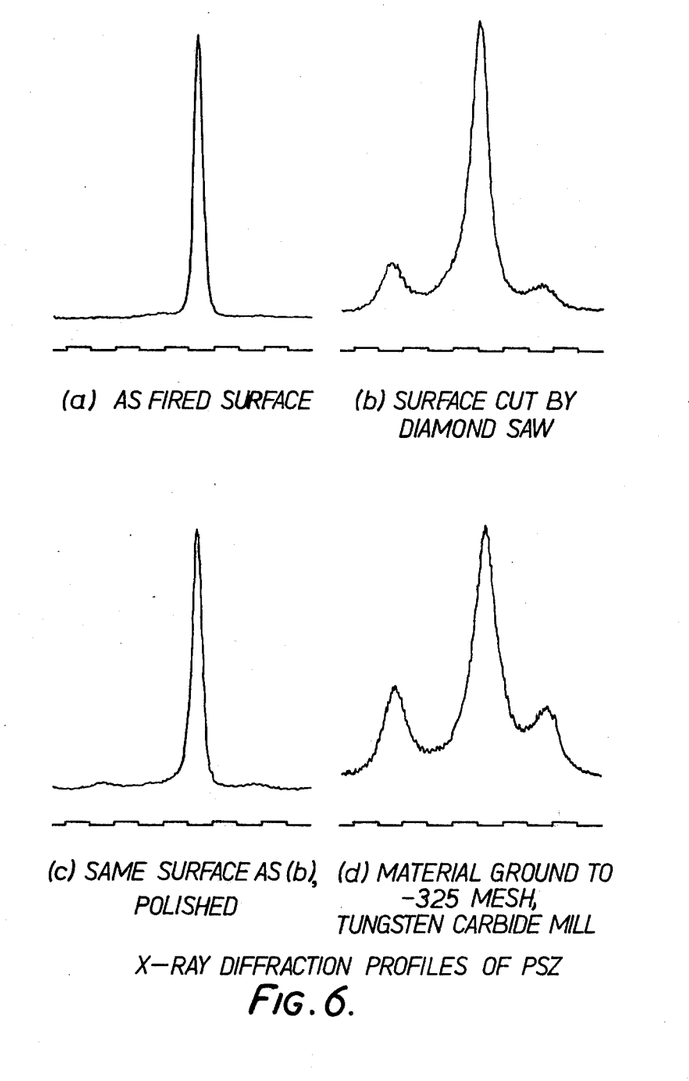
FIG. 6 is a set of X-ray profiles of PSZ ceramics showing the effect of surface treatment.

The stress-induced phase transformation is an energy-absorbing process and tends to inhibit crack propagation in PSZ, rendering it a tough material. The X-ray diffraction pattern of 'as fired' PSZ (FIG. 6a) shows little if any monoclinic material. When the surface is cut by a diamond saw, the stresses transform the metastable tetragonal domains (FIG. 6b). The original surface condition is nearly restored when the surface is polished (FIG. 6c), although the polishing process itself has resulted in a small amount of transformation. Finally when the ceramic is pulverized and milled (FIG. 6d), many more tetragonal domains are transformed. It is fair to conclude that the amount of transformation is proportional to the amount of work done on the system.

An additional benefit of the second phase tetragonal domains is that they exert a classical precipitation-strengthening effect. It is thought that the stress induced transformation mechanism is more important because the increases in strength observed tend to be much greater than those found with ordinary precipitation hardening and because the work of fracture is increased to several hundred $J/m^2$.

Figure 7:
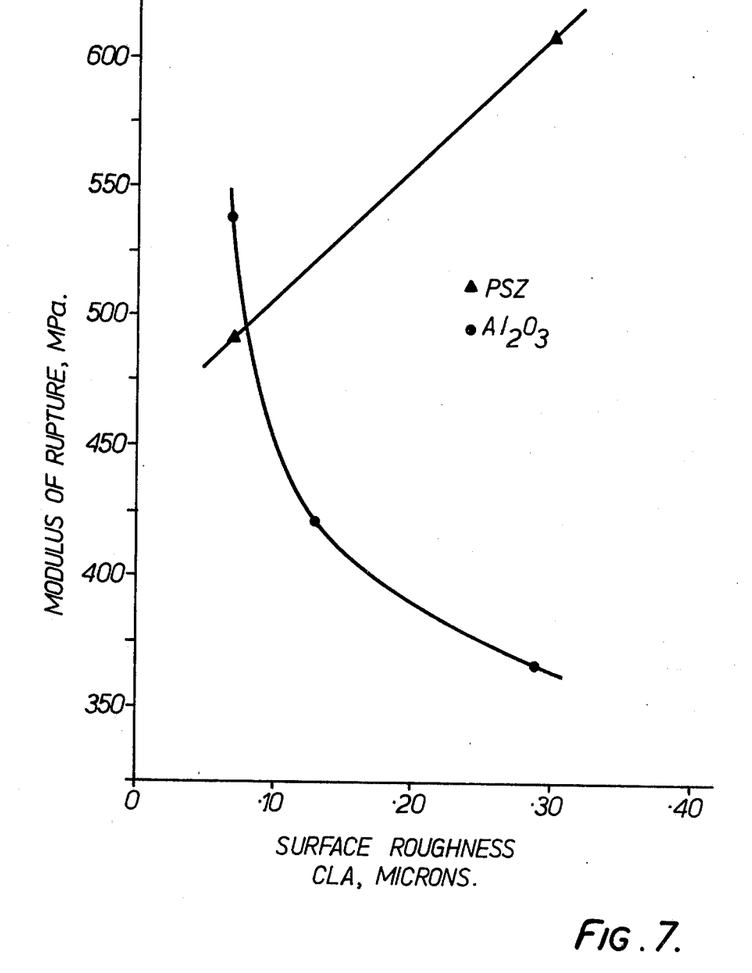
FIG. 7 is a graph showing the relationship of surface roughness and strength of PSZ and alumina.

Conventional, fine grained strong ceramic oxides fail in tension due to microscopic surface flaws introduced by the fabrication and machining processes. The strength normally decreases with increasing surface roughness. This behaviour is shown for alumina in FIG. 7 in which strength is plotted as a function of surface roughness as measured by the centre line average (CLA). Initially the alumina with a smooth polished surface is strong. As the surface is damaged by abrading it, the strength decreases markedly. For this reason, much current research and development is directed to finding ways of protecting ceramic surfaces from damage by placing them in compression and thus opposing crack opening. The behaviour of PSZ ceramics with the controlled microstructure is just the opposite of conventional materials. As shown in FIG. 7, the strength of polished PSZ with the controlled microstructure is high. But remarkably, when the surface is damaged by machining, the strength increases significantly. The reason is that the process of machining transforms the higher density tetragonal material in the surface layers to the lower density monoclinic phase thereby automatically placing the surface in compression. This is a most valuable property of the new ceramics and, therefore, they should constitute a useful class of engineering materials.

Figure 8:
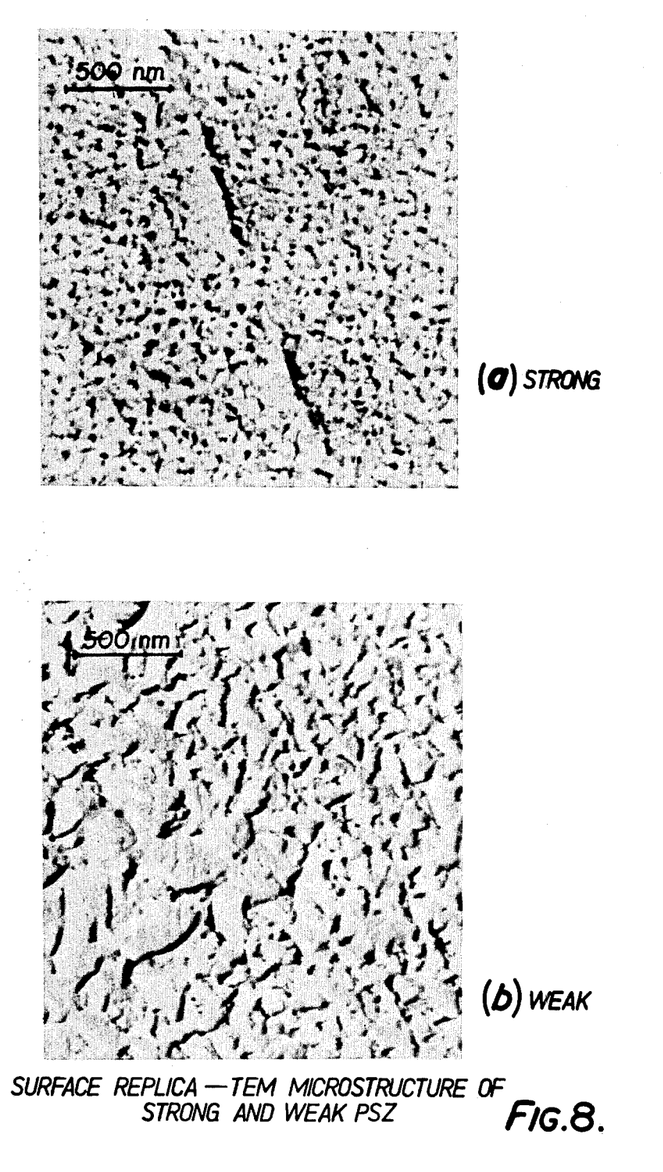
FIGS. 8(a) and 8(b) are electron micrographs of surface replicas of strong and weak PSZ ceramics.
Figure 9:
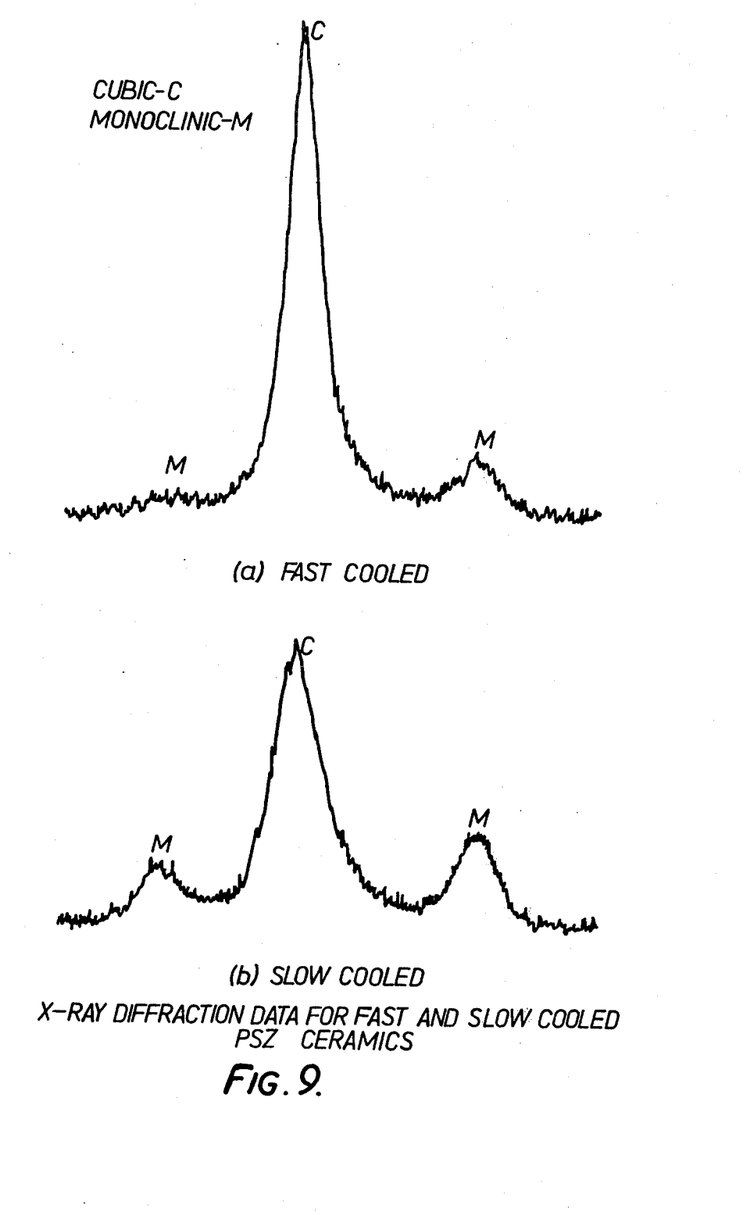
FIGS. 9 and 10 are X-ray diffraction profiles for fast and slow-cooled PSZ ceramics.

If the PSZ ceramics are cooled too slowly from the firing temperature to the ageing temperature or aged for too long or at too high a temperature, the two phase microstructure coarsens so much that, at room temperature, the formerly tetragonal domains have mostly transformed to their normal monoclinic structure and the material has only modest thermo-mechanical properties. FIG. 8(a) is a surface replica electron-micrograph of 3.6 weight percent material cooled near the optimum rate (MOR = 586 MPa), whilst FIG. 8(b) is the micrograph of the same composition cooled too slowly (MOR = 90 MPa). Note the pronounced coarsening of the fine-scale microstructure in the slow-cooled ceramic. The X-ray diffraction pattern of the weak material (FIG. 9b) shows considerably more monoclinic phase present than the strong material (FIG.

Figure 10:
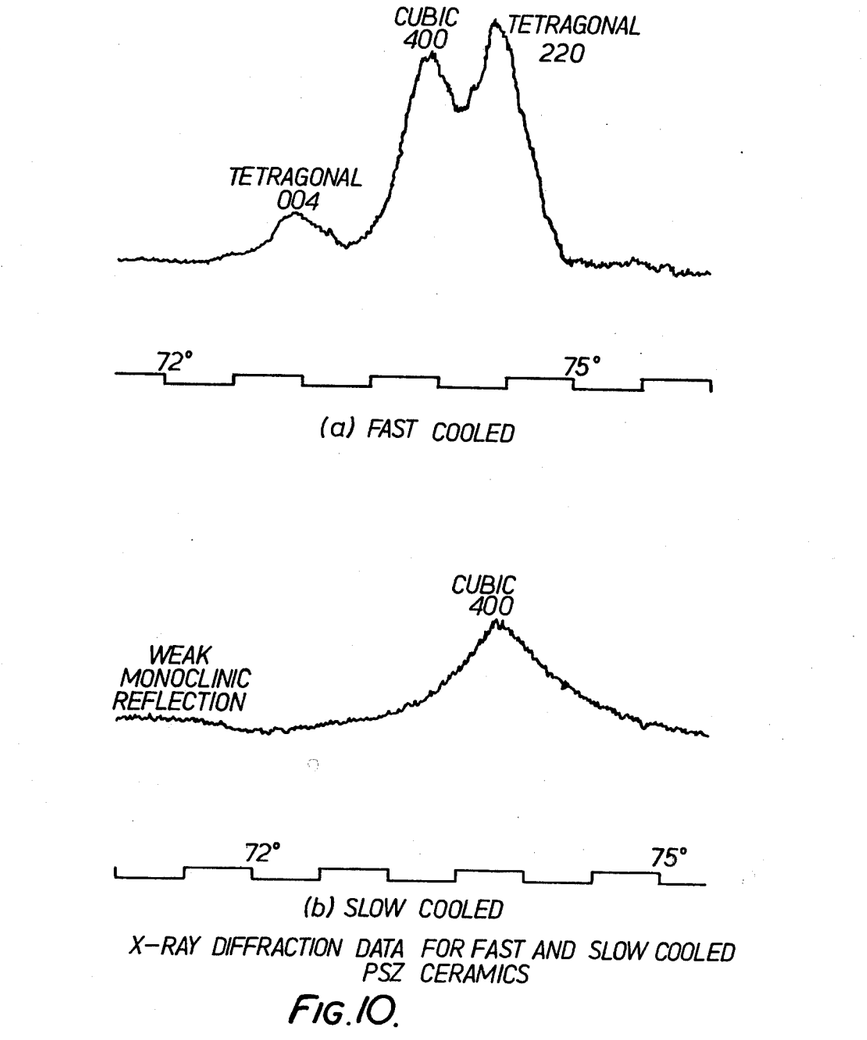

9a). Finally the X-ray diffraction pattern of the weak material shows no tetragonal material is present, (FIG. 10b), whilst the pattern of the strong material shows a considerable amount of tetragonal phase is present, (FIG. 10a).

However, if the PSZ ceramic is cooled too quickly, and not aged sufficiently, the tetragonal domains will be too small and will not transform when stressed and a much weaker material will result. The cooling-rate coupled with the ageing conditions must be such that the transformation of the metastable tetragonal domains will be triggered when stressed.

Essentially the same cooling and ageing procedures would apply to bodies or coatings made by fusion casting or flame and plasma spraying or other high temperature technique which produces the consolidated material already in the cubic stabilized form.

Uses for the materials of this inventon include extrusion dies for metals, particularly for copper, brass and stainless steel; blow-out orifices for continuously operating high-temperature, high-pressure autoclaving processes; high temperature bearings and metal cutting tool bits. With metal extruding for example, it is found that a much greater length of extrusion per die is achieved without the chemical and structural degradation generally experienced with currently used metallic dies.

The invention in its various aspects will be further described and elucidated by the following non-limiting example:

EXAMPLE

An extrusion die, 12.7 mm I.D., 36.5 mm O.D. and 20 mm thick was fabricated as follows.

A batch of zirconium dioxide (particle size 2.0 $\mu$ average) and calcium acetate powders were thoroughly mixed by wet ball-milling for 1 hour in an inert organic solvent. The zirconium oxide was 99.9% pure (excluding the naturally occurring hafnium dioxide impurity); the acetate was an "Analar" analytical grade chemical. The mixed batch was then calcined at 1050° C for 24 hours to decompose the calcium salt. The final composition was 3.7 wt. % CaO. The batch was wet-milled for 1 hour in an inert organic solvent in which 4 wt % Carbowax 4000 had been dissolved.

After milling, the solvent was evaporated and the dried powder granulated through a 50 mesh screen. A 'green' cylinder (the die blank) was isostatically pressed at 20,000 psi. The 'green' ware was fired at 1850° C for 3 hours and then cooled at 526° C/hour to 1300° C. The die blank was aged at this last temperature for 40 hours.

The oversize blank thus produced was machined to the dimensions cited earlier using diamond tooling. The finished die was then encased in a tool-steel die holder by a standard shrink-fitting technique. Finally the die was tested in the production line of a commercial brass extruder.

Performance was assessed by measuring the surface roughness of the extruded brass rod as a function of the number of extrusions. The data are plotted in FIG. 11. The surface roughness decreased from its initial (acceptable) value to a lower (even more acceptable) one which remained constant even when the number of extrusions approached 1000 — indicating a very long life is to be expected from dies manufactured in accordance with this invention.

Figure 11:
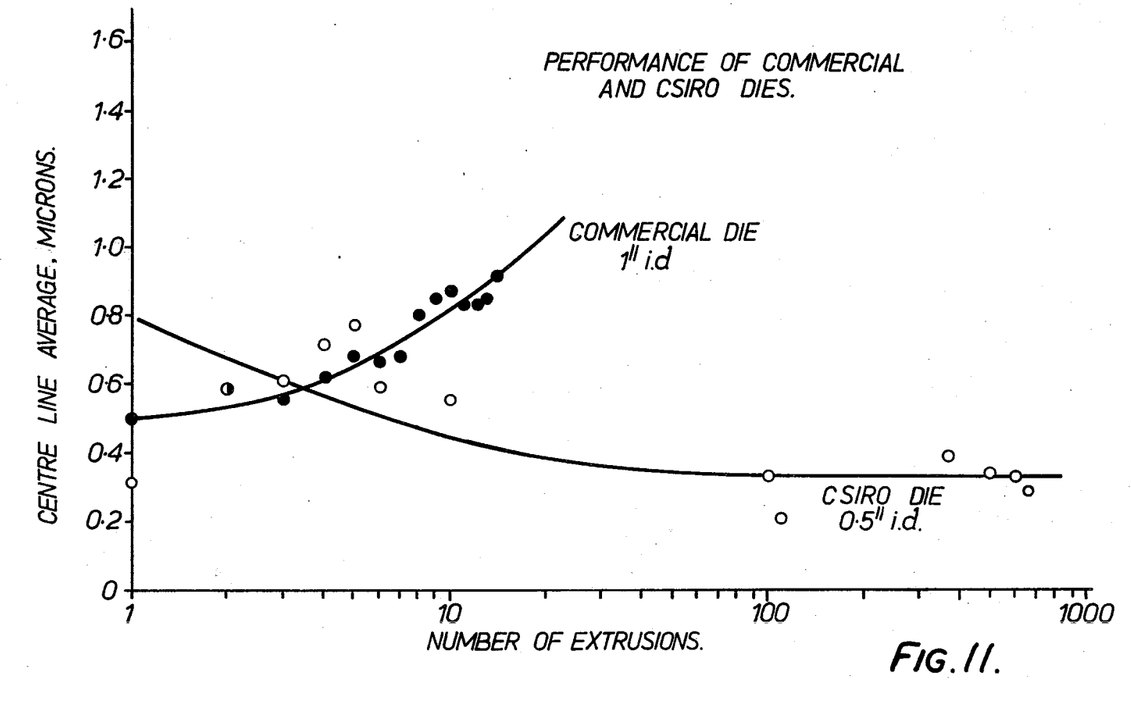
FIG. 11 compares the performances of a commercial die and one made according to the present invention.

In the case of the commerical zirconia die, the surface roughness increased monotonically as the number of extrusions increased, as also shown in FIG. 11. Such data indicates that only a very modest die life is likely with present commerical dies.

The claims defining the invention are as follows:

1. A refractory ceramic consisting essentially of a calcia-partially-stabilised zirconia body, and characterised in that the calcia concentration lies in the range 3.3–4.7 percent by weight of the ceramic body, and in that said body has a fine-scale two-phase microstructure substantially consisting of metastable, tetragonal domains of a critical size within cubic matrix grains, which domains, in regions of high stress, irreversibly transform to normal monoclinic form upon stressing of the body.

2. A ceramic as claimed in claim 1, wherein the calcia content is in the range 3.4 to 4.2 percent by weight.

3. A ceramic as claimed in claim 1, wherein the calcia content is about 4% by weight.

4. A process for forming a partially stabilized zirconia ceramic which consists of firing a zirconia body containing between 3.3 and 4.7 percent by weight of calcia at a temperature between 1700° C and 1950° C and allowing the body to cool at an average rate of at least 175° C per hour until the temperature is within the range 1200° to 1450° C; and ageing the body at a temperature in the range 1200° C to 1450° C for a time such that peak strength is obtained.

5. A process as claimed in claim 4, wherein the minimum firing temperature is 1830° C when the calcia content is 3.3% by weight and is 1700° C when the calcia content is 4.1% by weight or greater and the maximum ageing temperature is 1500° C when the calcia content is 3.3% by weight and is 1300° C when the calcia content is 4.7% by weight and the corresponding temperatures for intermediate compositions are scaled linearly between these limits.

6. A process as claimed in claim 5, wherein the ageing temperature is about 1300° C.

7. A process as claimed in claim 4, wherein the cooling rate is between 175° C and 600° C per hour.

8. A process as claimed in claim 4, wherein the body is fired, cooled and aged in a single sequence of operations.

9. A process as claimed in claim 4, wherein the ageing of the body is carried out as a separate operation subsequent to firing and cooling of the body.

10. A process for fabricating a partially stabilized zirconia ceramic which comprises the steps of:
 a. preparing a ceramic mixture consisting of, on an analytical oxide basis, zirconia and calcia, or their ceramic equivalents, in proportions such that the calcia, on firing, comprises between 3.3 and 4.7 percent by weight of the product;
 b. moulding the mixture into a body which after firing will have the required dimensions;
 c. heating the body to the firing temperature in the range 1700°–1950° C for a period of about 3 to 5 hours; and
 d. allowing the body to cool at an average rate in the range 175° C to 600° C per hour to an ageing temperature in the range 1200° C to 1350° C, and maintaining it at that temperature until peak strength is obtained; then
 e. allowing the body to cool to ambient temperature.

11. A process for fabricating a partially stabilized zirconia ceramic which comprises the steps of:
 a. preparing a ceramic mixture consisting of, on an analytical oxide basis, zirconia and calcia, or their ceramic equivalents, in proportions such that the calcia, on firing, comprises between 3.3 and 4.7 percent by weight of the product;

b. moulding the mixture into a body which after firing will have the required dimensions;

c. heating the body to the firing temperature in the range 1700°–1950° for a period of about 3 to 5 hours; and d. allowing the body to cool at an average rate in the range 175° C to 600° C per hour to a temperature in the range 1200° C to 1350° C;

e. allowing the body to cool further to ambient temperature; and f. subsequently reheating the body to an ageing temperature in the range 1200° to 1350° C and maintaining it at that temperature until peak strength is obtained.

12. A process as claimed in claim 10, wherein the calcia content after firing is about 4.0 percent by weight, the firing is carried out at about 1800° C for about 3 hours, the cooling rate is about 526° C per hour and the ageing is carried out at about 1300° C for about 64 hours.

13. A process as claimed in claim 10, wherein the calcia is added in the form of a powder of a heat-decomposable compound which gives rise to pure calcia as its solid decomposition product, and the mixture of step (a) is calcined and milled prior to moulding in step (b).

14. A process as claimed in claim 10, wherein a binder is added to the mixture before moulding.

15. A partially stabilized zirconia ceramic body produced by the method claimed in claim 4.

16. A die comprising the ceramic material of claim 1.

17. A process as claimed in claim 11, wherein the calcia content after firing is about 4.0 percent by weight, the firing is carried out at about 1800° C for about 3 hours, the cooling rate is about 526° C per hour and the ageing is carried out at about 1300° C for about 64 hours.

* * * * *